United States Patent
Naqvi

(10) Patent No.: US 12,035,830 B2
(45) Date of Patent: Jul. 16, 2024

(54) DEVICE FOR SECURING ORNAMENTS TO A TREE

(71) Applicant: Ayaan Hamza Naqvi, Shelton, CT (US)

(72) Inventor: Ayaan Hamza Naqvi, Shelton, CT (US)

( * ) Notice: Subject to any disclaimer, the term of this patent is extended or adjusted under 35 U.S.C. 154(b) by 397 days.

(21) Appl. No.: 16/948,747

(22) Filed: Sep. 30, 2020

(65) Prior Publication Data

US 2021/0100387 A1    Apr. 8, 2021

Related U.S. Application Data

(60) Provisional application No. 62/911,557, filed on Oct. 7, 2019.

(51) Int. Cl.
    *A47G 33/10*    (2006.01)
    *F16M 13/02*    (2006.01)

(52) U.S. Cl.
    CPC ........... *A47G 33/10* (2013.01); *F16M 13/022* (2013.01)

(58) Field of Classification Search
    CPC .... A47G 33/10; F16M 13/022; F16G 11/101; F16G 11/14
    See application file for complete search history.

(56) References Cited

U.S. PATENT DOCUMENTS

| | | | |
|---|---|---|---|
| 1,747,450 A * | 2/1930 | Mares | A47G 33/10 248/689 |
| 1,747,893 A | 2/1930 | Fisher | |
| 1,895,656 A | 1/1933 | Gadke | |
| 2,046,781 A | 7/1936 | Head | |
| 2,220,568 A | 11/1940 | Fishel | |
| 2,353,853 A * | 7/1944 | Sayford | A47G 33/105 428/11 |
| 2,599,303 A | 6/1952 | Ward | |
| 2,688,202 A * | 9/1954 | O'Neill | A47G 33/08 24/698.3 |
| 2,755,054 A | 7/1956 | Churella | |
| 2,997,800 A | 8/1961 | Ross | |
| 3,124,856 A | 3/1964 | Fleminger | |
| 3,333,307 A | 8/1967 | Wheeler | |
| 3,484,070 A | 12/1969 | Horodko et al. | |
| 3,635,783 A * | 1/1972 | Rimmler | A47G 33/105 428/11 |
| 3,704,487 A | 12/1972 | Mohr | |
| 4,452,836 A | 6/1984 | Daniel, Jr. | |
| 4,909,466 A | 3/1990 | Matthews | |
| 5,383,638 A | 1/1995 | Dieringer et al. | |
| 5,697,128 A * | 12/1997 | Peregrine | F16G 11/101 24/482 |

(Continued)

*Primary Examiner* — David M Upchurch
(74) *Attorney, Agent, or Firm* — Offit Kurman, P.A.; Tod A. Kupstas

(57) ABSTRACT

A device for securing ornaments to a tree and equally useful as a device for securing lightweight objects to an elongated object. The device may include a looped filament; a base secured to a portion of the filament; and a toggle releasably secured to the looped filament, wherein the looped string is attached to the lightweight object and the toggle secures the looped string to a the elongated object by clamping or cinching it. The lightweight object may be a holiday ornament and the elongated object a portion of a tree branch or limb, wherein the device festoons holiday ornament on the tree.

11 Claims, 1 Drawing Sheet

(56) References Cited

U.S. PATENT DOCUMENTS

| | | | | |
|---|---|---|---|---|
| 5,711,032 A * | 1/1998 | Carpenter | | F16G 11/101 |
| | | | | 2/161.1 |
| 5,896,623 A * | 4/1999 | Martin | | F16L 3/233 |
| | | | | 24/3.13 |
| 6,029,870 A * | 2/2000 | Giacona, III | | A45F 5/02 |
| | | | | 224/675 |
| 6,073,319 A * | 6/2000 | Silagy | | A43C 7/04 |
| | | | | 24/713.9 |
| 6,155,526 A | 12/2000 | Brown | | |
| 6,883,768 B1 | 4/2005 | Morin | | |
| 9,179,751 B2 * | 11/2015 | Lei | | A45D 8/34 |
| 10,113,265 B2 * | 10/2018 | Durney | | F16B 2/10 |
| 10,145,448 B2 * | 12/2018 | Laurant | | F16B 2/26 |
| 10,941,835 B2 * | 3/2021 | Marchant | | F16G 11/14 |
| 2002/0175255 A1 | 11/2002 | Hermanson | | |
| 2003/0005557 A1 * | 1/2003 | Renn | | B65D 63/16 |
| | | | | 24/115 G |
| 2003/0077406 A1 * | 4/2003 | Walls | | A47G 33/08 |
| | | | | 428/7 |
| 2005/0092789 A1 * | 5/2005 | Giacona | | A45F 3/14 |
| | | | | 224/257 |
| 2005/0173477 A1 * | 8/2005 | Scott | | A45F 5/02 |
| | | | | 224/148.6 |
| 2006/0278793 A1 * | 12/2006 | Granston | | F16B 45/035 |
| | | | | 248/302 |
| 2009/0049654 A1 * | 2/2009 | Iosue | | F16G 11/101 |
| | | | | 24/712.1 |
| 2010/0257701 A1 * | 10/2010 | Gammell | | A43C 7/00 |
| | | | | 24/115 G |
| 2012/0003404 A1 * | 1/2012 | Hamlin | | A47G 33/10 |
| | | | | 29/525.08 |
| 2013/0111709 A1 * | 5/2013 | Wen | | E06B 9/326 |
| | | | | 24/115 F |
| 2015/0017382 A1 | 1/2015 | Forbes et al. | | |
| 2018/0338635 A1 | 11/2018 | Thompson | | |
| 2019/0093819 A1 * | 3/2019 | Muller | | F16G 11/00 |
| 2019/0159622 A1 | 5/2019 | Miner | | |
| 2021/0079978 A1 * | 3/2021 | Kraus | | F16G 11/14 |

* cited by examiner

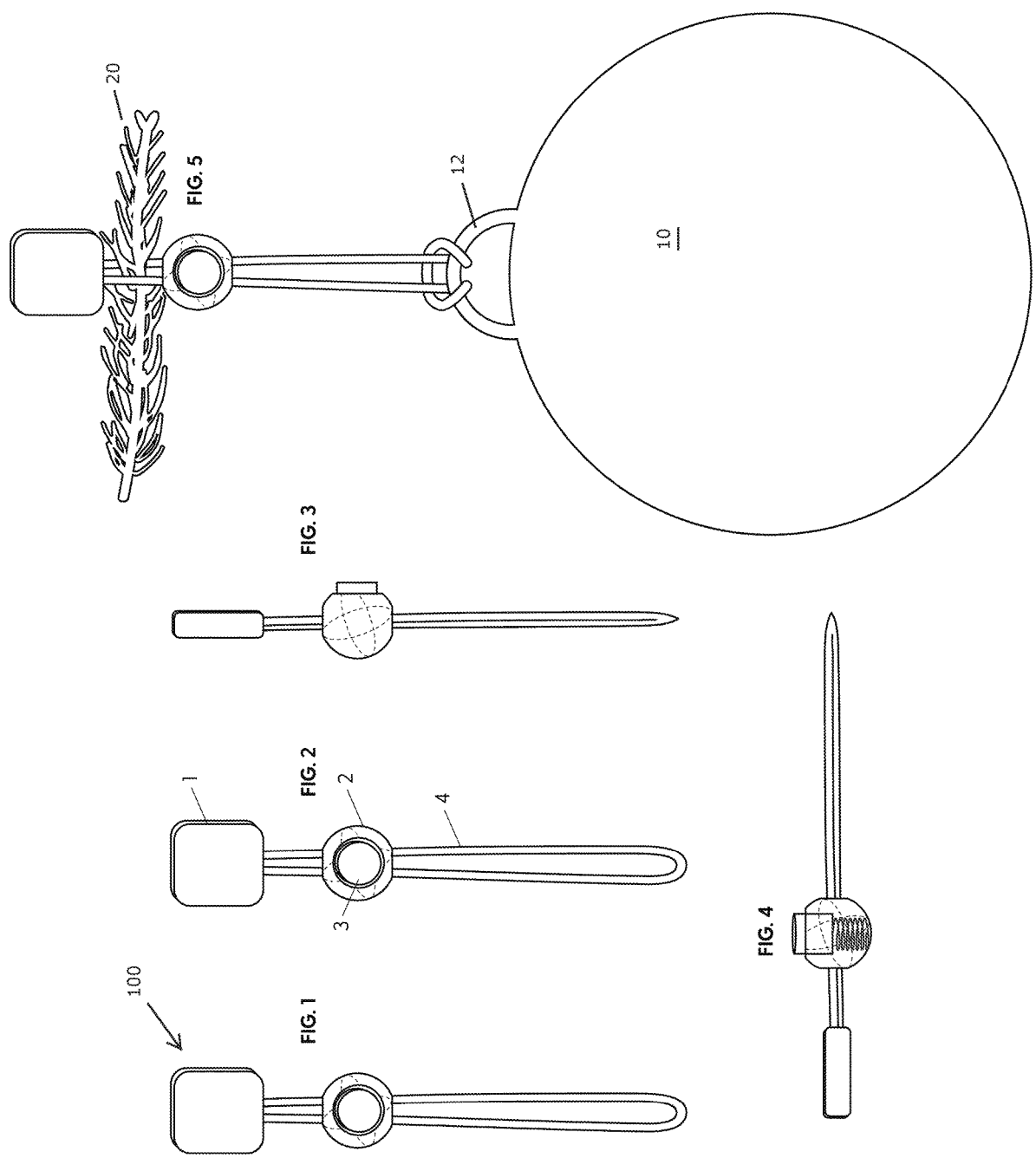

DEVICE FOR SECURING ORNAMENTS TO A TREE

CROSS-REFERENCE TO RELATED APPLICATION

This application claims the benefit of priority of U.S. provisional application No. 62/911,557, filed 7 Oct. 2019, the contents of which are herein incorporated by reference.

BACKGROUND OF THE INVENTION

The present invention relates to holiday ornaments and, more particularly, to a device for securing Christmas ornaments to a Christmas tree.

Christmas ornaments are decorations (usually made of glass, metal, wood, or ceramics) that are used to festoon a Christmas tree. Ornaments take many different forms, from a simple round ball to highly artistic designs. Ornaments are currently attached to the tree by using hooks or strings. Bumping into the tree may easily dislodge ornaments attached by these traditional means, causing it to fall and break.

As can be seen, there is a need for a device for securing a first object to a second object, wherein the first object may be a holiday ornament and the second object is a portion of a tree.

SUMMARY OF THE INVENTION

In one aspect of the present invention, a device for removably securing a first object with an anchor to a second object includes the following: a filament loop; a toggle stopper fixed to the filament loop; and a toggle operatively associated with the filament loop in such a way that the toggle is movable between a secured condition and an unsecured condition slidable along the filament loop.

In another aspect of the present invention, a device for removably securing an ornament with an anchor to a portion of a tree includes the following: a filament loop, wherein the filament loop is selected one of a (i) string, (ii) ribbon, and (iii) thread; a toggle stopper fixed to the filament loop; and a toggle operatively associated with the filament loop in such a way that the toggle is movable between a secured condition and an unsecured condition slidable along the filament loop, wherein the toggle comprises a spring button configured to enable the secured and unsecured conditions, wherein the filament loop is a closed loop with a knot, and the knot is the toggle stopper, and wherein the filament loop is a closed loop with a knot, and the knot is enclosed by the toggle stopper, or wherein the filament loop is an endless loop.

In yet another aspect of the present invention, the method of securing an ornament with an anchor to a tree, the method including the following: providing a filament loop having a toggle stopper; sliding two portions of the filament loop through a toggle configured to be movable between a secured condition and an unsecured condition slidable along the filament loop; pulling the filament loop approximately halfway through the anchor; tucking the toggle stopper through the filament loop so that the filament loop cinches the anchor; passing a portion of the tree through a portion of the filament loop between the toggle stopper and the toggle; sliding the toggle in the unsecured condition along the two portions of the filament loop toward the toggle stopper; and moving the toggle to the secured condition.

These and other features, aspects and advantages of the present invention will become better understood with reference to the following drawings, description and claims.

BRIEF DESCRIPTION OF THE DRAWINGS

FIG. 1 is a front view of an exemplary embodiment of the present invention;

FIG. 2 is a front view of an exemplary embodiment of the present invention;

FIG. 3 is a side view of an exemplary embodiment of the present invention;

FIG. 4 is a cross sectional view of an exemplary embodiment of the present invention; and FIG. 5 is a front view exemplary embodiment of the present invention shown in use.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a device for securing ornaments to a tree and equally useful as a device for securing lightweight objects to an elongated object. The device may include a looped filament; a base secured to a portion of the filament; and a toggle releasably secured to the looped filament, wherein the looped string is attached to the lightweight object and the toggle secures the looped string to a the elongated object by clamping or cinching it. The lightweight object may be a holiday ornament and the elongated object a portion of a tree branch or limb, wherein the device festoons holiday ornament on the tree.

The present invention includes a device that secures lightweight objects to an elongated object. Wherein the lightweight object is an ornament and the elongated object is a portion of a tree, the present invention prevents ornaments from falling off trees and breaking. The ornament is secured with filament, a toggle switch and a toggle stopper. When the filament is on the branch, the toggle switch and stopper is used to secure the ornament to the branch by clamping the branch in between the toggle and the toggle stopper. The present invention prevents ornaments that have sentimental and/or significant value to people from falling and breaking, especially since holiday displays can be high-traffic, high-excitement areas of a household.

Referring now to FIGS. 1 through 5, the present invention includes an attachment device 100 having a looped filament 4 connected to a toggle stopper 1. A toggle 2 includes a spring button 3. The filament 4 runs through the toggle 2 and is secured by the toggle stopper 1. The toggle 2 clamps against the filament 4. Pressing the button 3 releases the clamp and allows the toggle 2 to slide along the filament 4. Note, the dashed line on the toggle 2 represents that the toggle 2 may be a cylindrical.

The filament 4 may be string, thread, ribbon, streamer, or any flexible fiber. The filament 4 may form a closed loop wherein the legs (and possibly the knot) of the closed loop are integrated with or embedded in the toggle stopper 1. In some embodiments, the filament 4 loop may be an endless loop. The loop is elongated so that two portions of filaments 4 are generally adjacent to each other. The toggle 2 has a void through which the two portions of the filament 4 loop can slide through. The spring button 3 is biased on an engaged, secured, non-slidable condition securing said two portions of the filament 4 loop to the toggle 2. Engaging the spring button moves the toggle 2 to an unsecured, slidable condition.

The filament 4 is coupled to a first object 10. A portion of the looped filament 4 disposed in between the toggle stopper 1 and the toggle is placed around a second object 20. The second object 20 may be elongated with a free end, wherein a user slides the loop of the filament over the free end of the second object 20. A user then presses the spring button 3 and moves the toggle 2 upward towards the second object 20 and clamps and secures the second object 20 in between the toggle 2 and the toggle stopper 1. By using the toggle 2, the first object 10, say an ornament, is secured to the second objection 20, say a branch, so that the ornament cannot easily fall of the branch.

A method of making the present invention may include the following. Cut a string or elastic four to twelve inches. Feed each end into a toggle (spring loaded plastic component) and then put both ends of the string together and tie a knot. A plastic piece (e.g., toggle stopper 1) must be added to the end so the toggle cannot get disconnected from the filament and get lost in the assembly process or storage process.

Referring to FIG. 5, a method of using the present invention may include the following. If necessary, remove the current string or hook from the ornament one desires to festoon to a tree. This pre-existing string or hook is engaged with an anchor (ring or shackle) 12 associated with the ornament 10. Pull the filament loop approximately halfway through the anchor 12 and tuck the toggle stopper end through the opposing end of the filament loop to cinch the filament loop to the anchor 12. Place the ornament onto the tree branch by sliding the branch between the portion of the filament loop disposed between the toggle stopper and the toggle. Using the toggle in conjunction with the toggle stopper tighten the filament loop around the branch.

It should be understood, of course, that the foregoing relates to exemplary embodiments of the invention and that modifications may be made without departing from the spirit and scope of the invention as set forth in the following claims.

What is claimed is:

1. A system for use with holiday trees comprising:
   a holiday tree ornament having an anchor;
   a filament loop secured to the anchor;
   a toggle stopper fixed to the filament loop, wherein the filament loop is knotted together within the toggle stopper; and
   a toggle operatively associated with the filament loop in such a way that the toggle is movable between a secured condition and an unsecured condition slidable along the filament loop, wherein the holiday tree ornament is secured to a portion of a holiday tree.

2. The system of claim 1, wherein the toggle comprises a spring button configured to enable the secured and unsecured conditions.

3. The system of claim 1, wherein the filament loop is a selected one of a (i) string, (ii) ribbon, and (iii) thread.

4. The system of claim 1, wherein when the toggle is in the secured position the holiday tree ornament is secured to a tree branch.

5. The system of claim 1, wherein two portions of the filament loop are operatively associated with the toggle.

6. The device for removably securing a first object with an anchor to a second object of claim 1, wherein the filament loop is a closed loop with a knot, and the knot is the toggle stopper.

7. The system of claim 1, wherein the filament loop is an endless loop.

8. A system for use with holiday trees comprising:
   a holiday tree ornament;
   a filament loop, wherein the filament loop is selected one of a (i) string, (ii) ribbon, and (iii) thread, and the filament loop is operably connected to the holiday tree ornament;
   a toggle stopper fixed to the filament loop, wherein the filament loop is knotted together within the toggle stopper; and
   a toggle operatively associated with the filament loop in such a way that the toggle is movable between a secured condition and an unsecured condition slidable along the filament loop, wherein the toggle comprises a spring button configured to enable the secured and unsecured conditions, wherein the holiday tree ornament is secured to a portion of a holiday tree.

9. The device for removably securing an ornament with an anchor to a portion of a tree of claim 8, wherein the filament loop is a closed loop with a knot, and the knot is the toggle stopper.

10. The system of claim 8, wherein the filament loop is an endless loop.

11. A method of securing an ornament with an anchor to a tree, the method comprising:
    providing a holiday tree ornament having an anchor;
    providing a filament loop having a toggle stopper; wherein the filament loop is knotted together within the toggle stopper;
    providing a toggle operatively associated with the filament loop,
    sliding two portions of the filament loop through the toggle, wherein the toggle is configured to be movable between a secured condition and an unsecured condition slidable along the filament loop;
    pulling the filament loop approximately halfway through the anchor;
    tucking the toggle stopper through the filament loop so that the filament loop cinches the anchor;
    passing a portion of the tree through a portion of the filament loop between the toggle stopper and the toggle;
    sliding the toggle in the unsecured condition along the two portions of the filament loop toward the toggle stopper; and
    moving the toggle to the secured condition.

* * * * *